United States Patent Office 3,523,126
Patented Aug. 4, 1970

3,523,126
TESTOSTERONE AND 19-NORTESTOSTERONE(4'-METHYLBICYCLO[2.2.2]OCTANE - 1' - METHYL) CARBONATE AND SELECTED DERIVATIVES
George Albert Boswell, Jr., Wilmington, Del., assignor to E. I. du Pont de Nemours and Company, Wilmington, Del., a corporation of Delaware
No Drawing. Filed Dec. 13, 1967, Ser. No. 690,093
Int. Cl. C07c 169/22
U.S. Cl. 260—397.4                12 Claims

ABSTRACT OF THE DISCLOSURE

Described and claimed are bicyclo[2.2.2]octane-1'-methyl and 4'-methylbicyclo[2.2.2]octane-1'-methyl carbonates and the corresponding octene carbonates of variously substituted testosterones and 19-nortestosterones as represented by the formula

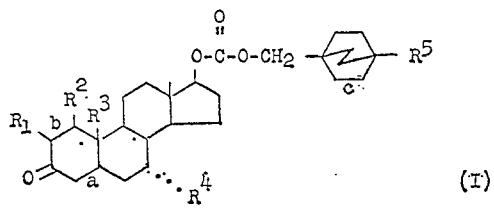

where $R^1$, $R^2$, $R^3$, $R^4$ and $R^5$ may be either H or $CH_3$, and $a$, $b$, and $c$ may be single or double bonds, all subject to the following provisos:

(1) If $R^3$ is H, $b$ must be a single bond.
(2) If $b$ is a single bond and $R^1$ is $CH_3$, $R^1$ must be in the α configuration.
(3) If any one of $R^1$, $R^2$ and $R^4$ is $CH_3$, the others must be H.
(4) If $R^2$ is $CH_3$, $b$ must be a double bond.

Also described are two methods by which the compounds of Formula I may be prepared:

(1) Reaction of the steroidal chloro- or fluoroformate with the bicyclooctylmethyl alcohol.
(2) Reaction of the steroidal alcohol with the bicyclooctylmethyl chloroformate.

The compounds of this invention are useful as agents producing prolonged and intense myotrophic or androgenic effects.

BACKGROUND OF THE INVENTION

Field of the invention

This invention relates to new carbonate esters of variously substituted testosterones and 19-nortestosterones. These esters are the bicyclo[2.2.2]octane-1'-methyl, bicyclo[2.2.2]oct-2-ene-1'-methyl, 4'-methylbicyclo[2.2.2]-octane-1'-methyl and 4'-methylbicyclo[2.2.2]oct-2-ene-1'-methyl carbonates of testosterone and related derivatives. Such compounds are characterized by the presence of a carbonyldioxy group,

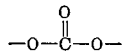

at the 17-position of the steroid nucleus to which group is bonded either a bicyclo[2.2.2]octane-1'-methyl or a 4'-methylbicyclo[2.2.2]octane-1'-methyl radical.

Description of the prior art

The following references from the prior art are believed to be pertinent to this invention:

(1) U.S. Pat. 3,056,727, issued Oct. 2, 1962, to Allais et al. and assigned to Roussel—UCLAF, discloses the cyclohexylcarbonates of testosterone and 19-nortestosterone and their preparation by the reaction of the steroidal alcohol with cyclohexyl chloroformate. The cyclohexylcarbonate of testosterone is reported to possess intense and prolonged androgenic activity.

(2) French Pat. M 1,215, issued Apr. 2, 1962, to Roussel—UCLAF, and its domestic equivalent, U.S. 3,314,856, issued Apr. 18, 1967, to Allais et al. and assigned to Roussel—UCLAF, disclose testosterone cyclohexylmethyl carbonate and its preparation by reacting testosterone with cyclohexylmethyl chloroformate. This product is reported to possess both intense and prolonged androgenic activity and substantial anabolic activity.

(3) French Pat. M 2,444, issued May 4, 1964, to Roussel—UCLAF, discloses 19-nortestosterone cyclohexylmethyl carbonate (called 3-oxo-17β-hydroxy-Δ⁴-estrene hexahydrobenzyl carbonate) and its preparation from 19-nortestosterone and cyclohexylmethyl chloroformate. The product is reported to possess marked anabolic and androgenic activity.

(4) U.S. Pat. 3,261,852, issued July 19, 1966, to Rapala and assigned to Eli Lilly and Company, discloses the 1-adamantoate esters of testosterone and nortestosterone. These compounds are reported to be anabolic agents of long activity duration.

(5) The copending application of Boswell, U.S. S.N. 597,555, now U.S. Pat. 3,443,813, filed Nov. 29, 1966, and assigned to E. I. du Pont de Nemours and Company, discloses the 1-adamantyl and 1-adamanatylmethyl carbonates of testosterone and 19-nortestosterone. These compounds are reported to possess useful androgenic-anabolic activities.

(6) The copending application of Scribner, U.S. S.N. 579,515, filed Sept. 15, 1966 now abandoned, and assigned to E. I. du Pont de Nemours and Company, discloses esters of testosterone and 19-nortestosterone with bicyclo-[2.2.2]octane - 1 - carboxylic acid and 4-methylbicyclo-[2.2.2]octane-1-carboxylic acid and the corresponding 2-octene acids. These compounds are reported to possess surprisingly high ratios of anabolic (myotrophic) to androgenic activity as compared to the parent testosterone alcohols or their common esters.

SUMMARY AND DETAILS OF THE INVENTION

The new compounds of this invention are represented by the general formula:

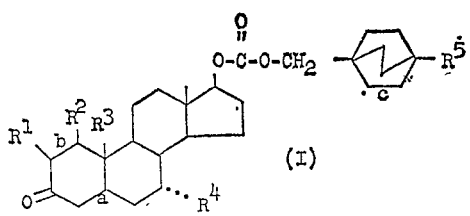

where $R^1$, $R^2$, $R^3$, $R^4$ and $R^5$ may be either H or $CH_3$, and $a$, $b$ and $c$ may be single or double bonds with the provisos that (1) if R³ is H, b must be a single bond;
(2) if b is a single bond and R¹ is CH₃, R¹ must be in the α configuration;
(3) if any one of R¹, R² and R⁴ is methyl, the others must be H;
(4) if R² is CH₃, b must be a double bond.

The novel compounds represented by Formula I may be prepared by either of two synthetic routes. The first involves the reaction of steroidal chloro- or fluoroformate with free alcohol as represented in the following equation where X=Cl or F and all other symbols have the previously stated significance:

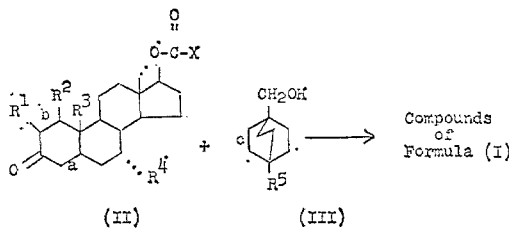

The fluoroformates corresponding to Formula II are prepared by reaction of the appropriately substituted testosterone or 19-nortestosterone in methylene chloride with carbonyl fluoride under pressure. The bicyclooctyl alcohols of Formula III may conveniently be prepared from the corresponding acids upon esterification followed by lithium aluminum hydride reduction. Steroidal chloroformates are available by use of phosgene in place of carbonyl fluoride.

An alternative route to the compounds represented by Formula I comprises reacting the free steroidal alcohol with the chloroformate of the appropriate bicyclooctyl alcohol as represented in the following equation where all symbols have the previously stated significance:

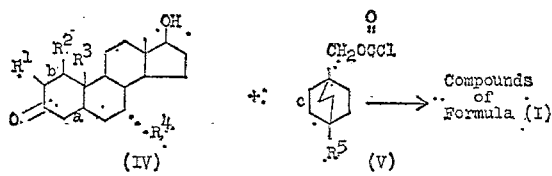

The chloroformates of Formula V are prepared by the reaction of the corresponding alcohol with phosgene.

The reactions for preparing the compounds of this invention as illustrated by the foregoing equations may be carried out at atmospheric or increased pressures and at temperatures ranging from −20° to 200° C. In general the reaction of chloroformates and alcohols takes place at lower temperatures than the analogous reaction of fluoroformates and alcohols. Preferably the reaction of fluoroformates and alcohols is conducted in refluxing benzene or toluene while the reaction of chloroformates and alcohols is carried out at room temperature or temperatures somewhat below.

In reacting the alcohols with the chloro- or fluoroformates it is advantageous to employ an excess of the alcohol in order to achieve full conversion of the formate to carbonate; it is easier to recover unreacted alcohol than unreacted formate.

DESCRIPTION OF PREFERRED EMBODIMENTS

There follow some nonlimiting examples illustrative of the invention.

EXAMPLE I (A) Ethyl 4-methylbicyclo[2.2.2]octane-1-carboxylate

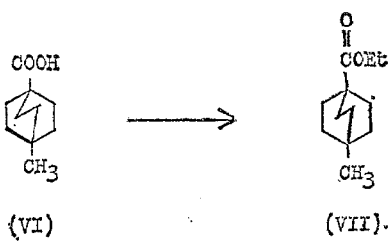

A solution of 10.0 g. of 4-methylbicyclo[2.2.2] octane-1-carboxylic acid (VI) in 200 ml. of ethanol and 10 ml. of concentrated sulfuric acid was heated to reflux for 2 hours after which the reaction mixture was concentrated under reduced pressure. The residual liquid was dissolved in about 100 ml. of benzene, and the benzene solution was washed successively with cold 5% sodium bicarbonate solution, water and saturated salt solution. The benzene solution was dried over MgSO₄ and evaporated on a rotary evaporator. The residue was distilled at 76°/1.7 mm., yield 8.80 g., $n_D^{25}$ 1.4582.

Infrared: $\lambda_{max.}^{film}$ 5.75 (ester carbonyl), 8.0μ (C—O—C)

(B) 4-methylbicyclo[2.2.2]octane-1-methanol

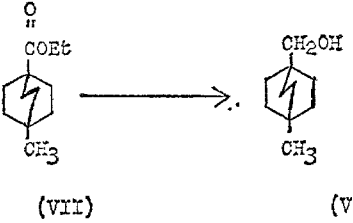

A solution of 8.8 g. of ester (VII) in 100 ml. of dry ether was added dropwise to a stirred solution of 1.96 g. of lithium aluminum hydride in 100 ml. of dry ether. The resultant mixture was cooled in an ice bath for over 30 minutes and then heated to reflux for 30 minutes, after which it was again cooled in an ice bath. At this point the excess reducing agent was decomposed by the cautious addition of saturated sodium sulfate solution. The mixture was filtered to remove salts, and the filtrate was washed successively with water and saturated salt solution, dried over anhydrous magnesium sulfate, and evaporated to dryness under reduced pressure to afford the alcohol (VIII) as a clear colorless syrup. This was purified by distillation which affords a colorless syrup, yield 5.76 g., B.P. 130°/4.5 mm., $n_D^{25}$ 1.4725.

Infrared: $\lambda_{max.}^{film}$ 2.90μ (—OH)

(C) 17β-hydroxy-4-estrene-3-one fluoroformate (or: 19-nortestosterone fluoroformate)

A solution of 19-nortestosterone (25.0 g.) in methylene chloride (100 ml.) was shaken with carbonyl fluoride (75 g.) in a pressure vessel at 20±2° C. for 10 hours. The reaction vessel was then vented, swept out with nitrogen, and its contents were transferred to a separatory funnel. The methylene chloride solution was washed with water, then with a saturated salt solution, dried over anhydrous magnesium sulfate and evaporated to dryness under reduced pressure. The residual clear, viscous syrup solidified on trituration with hexane. The crude product was recrystallized from hexane to afford 17β-hydroxy-4-estrene-3-one fluoroformate (IX) (23.4 g.) as crystals melting at 83–83.5° C., $[\alpha]_D^{23}$ +34° (c. 1.47, CHCl₃).

Analysis.—Calcd. for C₁₉H₂₅FO₃ (percent): C, 71.3; H, 7.85; F, 5.92. Found (percent): C, 71.42; H, 7.84; F, 5.88.

Infrared: $\lambda_{max}^{Nujol}$ 5.50 (—COF), 6.02 (C–3 conj. C=O), 6.20 (conj. C=C) and 8.0μ (—O—COF)

Ultraviolet: $\lambda_{max}^{EtOH}$ 240 (ε=18,000) and 312 mμ (ε=79).

(D) 17β-hydroxyestr-4-en-3-one (4'-methylbicyclo [2.2.2]octane-1'-methyl) carbonate

IX  VIII  X

A mixture of 2.0 g. of 19-nortestosterone fluoroformate (IX), 5.50 g. of 4-methylbicyclo[2.2.2]octane-1-methanol (VIII), 0.60 g. of dry pyridine and 100 ml. of dry benzene was heated to reflux with stirring under N₂ for 36 hours during which time a crystalline solid had sublimed into the reflux condenser. This solid was soluble in water. The solid was poured into water and extracted with methylene chloride. The extracts were washed with water and saturated salt solution, dried over MgSO₄ and evaporated under reduced pressure to afford a viscous, colorless syrup, the infrared spectrum of which indicated a good conversion to the carbonate (X).

Infrared: $\lambda_{max}^{CCl_4}$ 2.95(—OH), 550 (fluoroformate carbonyl, weak), 5.76 (carbonate carbonyl, strong), 601 (conj. C–3 carbonyl), 6.18μ (conj. C=C).

The crude reaction mixture was adsorbed from hexane onto a column of Florisil® (200 g.). Elution with 1.5% acetone in hexane (by volume) (cuts 7 and 8, 150 ml.) returned 3.35 g. of unreacted bicyclooctane-1-methanol (VIII) which solidified on standing. Cut 9 was a mixture of carbonate (X) and alcohol (VIII). Continued elution with the same solvent system (cuts 10–14) afforded 1.90 g. of carbonate X. The cuts were combined and then recrystallized from petroleum ether (B.P. 30–60°) to furnish 19 - nortestosterone (4' - methylbicyclo[2.2.2]octane-1'-methyl)carbonate (X, 1.0 g., 1st crop), M.P. 134–135°, $[\alpha]_D^{24}$ +43°.

*Analysis.*—Calcd. for C₂₉H₄₂O₄ (454.63) (percent): C, 76.7; H, 9.31. Found (percent): C, 76.56, 76.95; H, 9.46, 9.33.

Infrared: $\lambda_{max}$ 5.74 (carbonate carbonyl), 5.95 (conj. carbonyl), 6.17 (conjugated C=C), 8.0μ (C—O—C)

Ultraviolet: $\lambda_{max}$ 238 (17,700) and 312 mμ (75)

¹H n.m.r.: 0.78 (4'-methyl), 0.88 (C–18—H), 1.40 (methylenes of bicyclooctane), 3.78

(—O—CH₂—C—), 5.84 p.p.m. (C–4 vinyl hydrogen)

EXAMPLE II (A) 17β-hydroxy-4-androstene-3-one fluoroformate (or: testosterone fluoroformate)

A solution of testosterone (50 g.) in methylene chloride (100 ml.) was shaken with carbonyl fluoride (150 g.) in a pressure vessel at 20±2° C. for 10 hours. The reaction mixture was processed as described in Example IC and the crude product was purified by crystallization from hexane. There was thus obtained 45.5 g. of 17β-hydroxy-4-androstene-3-one fluoroformate, M.P. 104–106° C., $[\alpha]_D^{23}$ +86° (c. 2.33, CHCl₃).

*Analysis.*—Calcd. for C₂₀H₂₇FO₃ (percent): C, 71.7; H, 8.13; F, 5.68. Found (percent): C, 72.06; H, 8.03; F, 5.74.

Infrared: $\lambda_{max}^{Nujol}$ 5.50 (—COF), 6.0 (C–3 conj. C=O), 6.22 (conj. C=C) and 8.0μ (—O—COF)

Ultraviolet: $\lambda_{max}^{EtOH}$ 238 mμ (ε=16,600)

(B) 17β-hydroxyandrost-4-en-3-one (4'-methylbicyclo [2.2.2]octane-1'-methyl) carbonate

XI  VIII  XII

A mixture of 1.50 g. of testosterone fluoroformate (XI), 3.0 g. of 4-methylbicyclo[2.2.2]octane-1-methanol (VIII), 0.5 ml. of dry pyridine and 55 ml. of dry benzene was allowed to react according to the procedure described in Example ID. The workup described in Example ID along with chromatography of the crude product on Florisil® and recrystallization of the product cuts from petroleum ether (B.P. 30–60°) furnished 1.40 g. of testosterone (4-methylbicyclo[2.2.2]octane-1'-methyl) carbonate (XII) as a colorless solid, M.P. 151–152°, $[\alpha]_D^{24}$ +82°. A second crop amounted to 0.17 g.

*Analysis.*—Calcd. for C₃₀H₄₄O₄ (468.65) percent: C, 76.88; H, 9.46. Found (percent): C, 76.71, 76.78; H, 9.10, 8.74.

Infrared: $\lambda_{max}$ 5.74 (carbonate carbonyl), 5.95 (conj. C–3 C–O—), 6.22 (conj. C=C), 8.0 (C—O—C)

Ultraviolet: $\lambda_{max}$ 240 (17,200) and 320 mμ (65)

¹H.N.M.R.: 0.78 (4'-methyl), 0.85 (18–H), 1.18 (19–H), 1.39 (bicyclooctane methylenes), 3.78

(—O—CH₂—C—), 4.52 (17α-hydrogen, triplet, J≅7–8 c.p.s.), 5.72 p.p.m. (C–4 vinyl hydrogen).

EXAMPLE III (A) 4-methylbicyclo[2.2.2]octane-1-hydroxylmethyl chloroformate

VIII  XIII  XIV 4-methylbicyclo[2.2.2]octane-1-methanol (VIII) is allowed to react with phosgene as described in J. Am. Chem. Soc., 88, 1988 (1966) to furnish the chloroformate (XIV) as a white crystalline solid.

(B) 17β-hydroxyestr-4-en-3-one (4'-methylbicyclo[2.2.2]octane-1'-methyl) carbonate

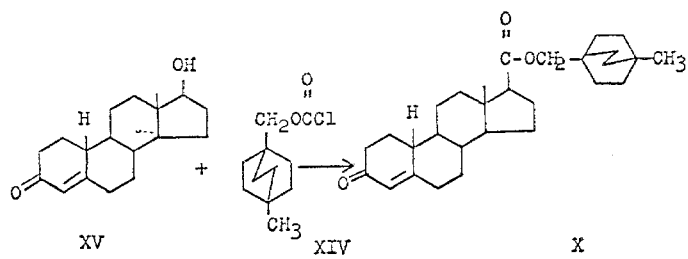

A solution of 4-methylbicyclo[2.2.2]octane-1-hydroxyethyl chloroformate (XIV) in dry benzene is added dropwise with stirring to a solution of 19-nortestosterone (XV) in 35 ml. of anhydrous pyridine that has been cooled to 10° C. After the addition is complete, the mixture is allowed to stir at ambient temperature for 20 hours. During this time copious amounts of pyridine hydrochloride are precipitated. The reaction mixture is washed with water and saturated salt solution, dried over anhydrous magnesium sulfate and evaporated to dryness under reduced pressure to leave a viscous syrup. The crude product is purified by chromatography on Florisil® followed by crystallization from petroleum ether (B.P. 30–60°) to give 17β-hydroxyestr-4-ene-3-one (4'-methylbicyclo[2.2.2]octane-1'-methyl) carbonate.

The preparation of other of the compounds of this invention as represented by Formula I is carried out in the same manner described in the foregoing examples using as starting materials the appropriately substituted testosterones or 19-nortestosterones. These additional compounds are set forth in Table I. The bicyclo[2.2.2]-oct-2-ene-1-methanols are readily available from bicyclo[2.2.2]oct-2-ene-1-carboxylic acid or the 4-methyl compound by conversion of the acid to its methyl ester followed by lithium aluminum hydride reduction. For each entry in Table I it should be understood that either the steroid or the alcohol may first be converted to either the chloro- or fluoroformate and that this intermediate may then be allowed to react with the appropriate partner.

TABLE I

| Steroid | Alcohol | Product |
|---|---|---|
| 7α-methyl-19-nortestosterone | 4-methylbicyclo[2.2.2]octane-1-methanol. | 7α-methyl-19-nortestosterone (4'-methylbicylco[2.2.2]octane-1'-methyl) carbonate. |
| Dihydrotestosterone | Bicyclo [2.2.2]-oct-2-ene-1-methanol | Dihydrotestosterone (bicyclo[2.2.2]oct-2'-ene-1'-methyl) carbonate. |
| 2α-methyl-17β-hydroxyandrostan-3-one | Bicyclo[2.2.2]-octane-1-methanol | 2-methyl-17β-hydroxyandrostan-3-one (bicyclo [2.2.2] octane-1'-methyl)carbonate. |
| 1-methyl-17β-hydroxyandrost-1-en-3-one | 4-methylbicyclo-[2.2.2]oct-2-ene-1-methanol. | 1-methyl-17β-hydroxyandrost-1-en-3-one (4'-methylbicyclo-[2.2.2]oct-2'-ene-1'-methyl) carbonate. |

TABLE I.—Continued

| Steroid | Alcohol | Product |
|---|---|---|
| 17β-hydroxyandrosta-1,4-dien-3-one | 4-methylbicyclo-[2.2.2]octane-1-methanol. | 17β-hydroxyandrosta-1,4-dien-3-one (4'-methylbicyclo [2.2.2]octane-1'-methyl) carbonate. |
| 7α-methyl-17β-hydroxyestr-1-en-3-one | Bicyclo[2.2.2]-octane-1-methanol | 7α-methyl-17β-hydroxyestr-1-en-3-one (bicyclo [2.2.2]-octane-1'-methyl) carbonate. |
| 17β-hydroxyestr-4-en-3-one | Bicyclo[2.2.2]oct-2-en-1-methanol | 17β-hydroxyestr-4-en-3-one (bicyclo[2.2.2] oct-2'-en-1' methyl) carbonate. |
| 2α-methyl-17β-hydroxy-5α-androstan-3-one | 4-methylbicyclo[2.2.2]oct-2-en-1-methanol. | 2α-methyl-17-βhydroxy-5β-androstan-3-one (bicyclo [2.2.2]oct-2'-en-1'-methyl) carbonate. |
| 17β-hydroxyandrost-1-en-3-one | 4-methylbicyclo-[2.2.2]oct-2-ene-methanol. | 17β-hydroxyandrost-1-en-3-one (4'-methylbicyclo[2.2.2] oct-2'-ene-1'-methyl) carbonate. |

TEST FOR PROLONGED ANDROGENIC-ANABOLIC ACTIVITY

Bioassays were conducted on the compounds of this invention to determine their pharmacological effect. In the procedure used, dosages of the compounds to be tested were administered on a single occasion to 21-day-old Simonsen albino rats. The rats were males made castrate the day of dosage administration. The administration was by subcutaneous injection of the test compound in 0.2 ml. of a vehicle composed of 90% sesame oil and 10% benzyl alcohol. Testosterone propionate was used as a standard.

The animals were sacrificed on the twenty-ninth day after administration and autopsied. The organs of interest were separated and weighed. Particular study was made of the lifter muscle of the anus (levator ani) as an indicator of anabolic activity and of the ventral prostate and seminal vesicles as indicators of the simultaneous androgenic activity.

The results of the bioassays are set forth in the tables below.

TABLE II.—PROLONGED RAT ANDROGEN ASSAY

| Compound Administered | Total Dose, mg. | No. of Rats | Mean Body Wt., g. | Tissue Ratio±S.E. | | | Mean Organ Wt. (mg.) | | |
|---|---|---|---|---|---|---|---|---|---|
| | | | | Pros-tate | Seminal Vesicles | Levator Ani | Vent. Prost. | Sem. Ves. | Lev. Ani |
| Control | | 6 | 207 | .03±.00 | .05±.00 | .22±.02 | 7.2 | 11.0 | 45.9 |
| Testosterone propionate | 3.4 | 7 | 219 | .17±.03 | .23±.03 | .26±.02 | 36.6 | 49.4 | 56.3 |
| 19-nortestosterone (4'-methylbicyclo [2.2.2]octane-1'-methyl) carbonate | 4.54 | 7 | 231 | .21±.04 | .21±.03 | .55±.01 | 47.9 | 48.0 | 126.5 |
| Testosterone (4'-methyl-bicyclo[2.2.2] octane-1'-methyl) carbonate | 4.68 | 7 | 235 | .40±.05 | .62±.15 | .35±.03 | 91.9 | 143.5 | 82.7 |
| 19-Nortestosterone-4'-methylbicyclo- [2.2.2]octane-1'-carboxylate | 4.52 | 7 | 216 | .04±.00 | .07±.01 | .35±.03 | 8.9 | 15.5 | 76.3 |

TABLE III.—CONCLUSIONS FROM PROLONGED RAT ANDROGEN ASSAY

| Compound administered | Androgenic activity | Anabolic activity |
|---|---|---|
| 19-nortestosterone (4'-methylbicyclo [2.2.2]octane-1'-methyl) carbonate. | ≥Testosterone propionate >19-nortestosterone-4'-methylbicyclo[2.2.2]oc-tane-1'-carboxylate. | >Testosterone propionate. >19-nortestosterone-4'-methylbicyclo[2.2.2]oc-tane-1'-carboxylate. |
| Testosterone (4'-methylbicyclo[2.2.2] octane-1'-methyl) carbonate. | >Testosterone propionate | >Testosterone propionate. |
| 19-nortestosterone-4'-methylbicyclo [2.2.2]octane-1'-carboxylate. | Inactive | Do. |

EXAMPLE A

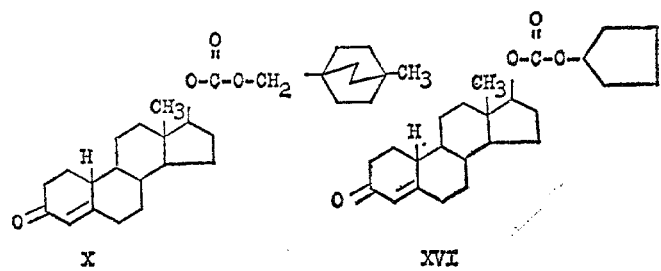

X       XVI

Biological testing has revealed significant differences in the biological activities of compound (X), a compound of this invention, and compound (XVI). For example, compound (X) possesses potent myotrophic activity (greater than testosterone propionate) with low androgenic activity (nearly the same as testosterone propionate). Compound (XVI), on the other hand, possesses low myotrophic activity (<0.5× testosterone propionate) and quite strong androgenic activity (ca. 1× testosterone propionate). These findings are a dramatic example of the beneficial effect of the "bulky" carbonate ester as compared to a relatively non-bulky ester moiety.

Since obvious modifications and equivalents in the invention will be evident to those skilled in the chemical arts, I propose to be bound solely by the appended claims.

The embodiments of the invention in which an exclusive property or privilege is claimed are defined as follows:

1. A compound of the formula:

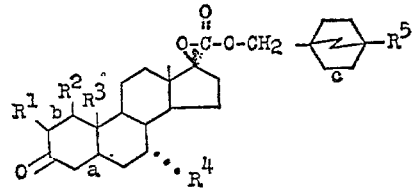

wherein
$R^1$, $R^2$, $R^3$, $R^4$ and $R^5$ are individually selected from the group consisting of hydrogen and methyl;
$a$, $b$ and $c$ are individually selected from the group consisting of a single bond and a double bond;
and the foregoing is subject to the following provisos:
(i) if $R^3$ is hydrogen, $b$ must be a single bond;
(ii) if $b$ is a single bond and $R^1$ is methyl, $R^1$ must be in the alpha configuration;
(iii) if any one of $R^1$, $R^2$ and $R^4$ is methyl, the others must be hydrogen;
(iv) if $R^2$ is methyl, $b$ must be a double bond.

2. The compound of claim 1 wherein $R^1=R^2=R^3=R^4$=hydrogen, $R^5$=methyl, $a$=a double bond and $b=c$=a single bond: 19-nortestosterone(4'-methylbicyclo [2.2.2]octane-1'-methyl) carbonate.

3. The compound of claim 1 wherein $R^1=R^2=R^4$=hydrogen, $R^3=R^5$=methyl, $a$=a double bond and $b=c$=a single bond: testosterone(4'-methylbicyclo[2.2.2] octane-1'-methyl) carbonate.

4. The compound of claim 1 wherein $R^1=R^2=R^3$=hydrogen, $R^4=R^5$=methyl, $a$=a double bond and $b=c$=a single bond: 7α-methyl-19-nortestosterone(4'-methylbicyclo[2.2.2]octane-1'-methyl) carbonate.

5. The compound of claim 1 wherein $R^1=R^2=R^4=R^5$=hydrogen, $R^3$=methyl, $a=b$=a single bond and $c$=a double bond: dihydrotestosterone(bicyclo[2.2.2]oct-2'-ene-1'-methyl) carbonate.

6. The compound of claim 1 wherein $R^1=R^3$=methyl, $R^2=R^4=R^5$=hydrogen and $a=b=c$=a single bond: 2α-methyl - 17β - hydroxyandrostan - 3 - one(bicyclo[2.2.2] octane-1'-methyl) carbonate.

7. The compound of claim 1 wherein $R^1=R^4$=hydrogen, $R^2=R^3=R^5$=methyl, $a$=a single bond and $b=c$=a double bond: 1 - methyl-17β-hydroxyandrost-1-en-3-one (4'-methylbicyclo[2.2.2]oct-2'-ene-1'-methyl) carbonate.

8. The compound of claim 1 wherein $R^1=R^2=R^4$=hydrogen, $R^3=R^5$=methyl, $a=b$=a double bond and $c$=a single bond: 17β - hydroxyandrosta-1,4-dien-3-one(4'-methylbicyclo[2.2.2]octane-1'-methyl) carbonate.

9. The compound of claim 1 wherein $R^1=R^2=R^3=R^5$=hydrogen, $R^4$=methyl, $a=c$=a single bond and $b$=a double bond: 7α - methyl - 17β - hydroxyestr-1-en-3-one (bicyclo[2.2.2]octane-1'-methyl) carbonate.

10. The compound of claim 1 wherein $R^1=R^2=R^4=$ hydrogen, $R^3=R^5=$methyl, $a=$a single bond and $b=c=$ a double bond: 17β - hydroxyandrost - 1 - en-3-one(4'-methylbicyclo[2.2.2]oct-2'-ene-1'-methyl) carbonate.

11. The compound of claim 1 wherein $R^1=R^2=R^3=R^4=R^5=$hydrogen, $b=$a single bond and $a=c=$a double bond: 17β-hydroxyestr - 4 - ene-3-one(bicyclo[2.2.2]oct-2'-en-1'-methyl) carbonate.

12. The compound of claim 1 wherein $R^1=R^3=$methyl, $R^2=R^4=R^5=$hydrogen, $a=b=$a single bond and $c=$a double bond: 2α-methyl-17β-hydroxy-5α-androstan-3-one(bicyclo[2.2.2]oct-2'-en-1'-methyl) carbonate.

References Cited

UNITED STATES PATENTS 3,056,727  10/1962  Allais et al.
3,314,856  4/1967  Allais et al.

HENRY A. FRENCH, Primary Examiner

U.S. Cl. X.R.

424—243